(12) United States Patent
Brin

(10) Patent No.: US 11,160,344 B2
(45) Date of Patent: Nov. 2, 2021

(54) PROTECTIVE CASE FOR PHOTOGRAPHY EQUIPMENT

(71) Applicant: Marla Brin, Alexandria, VA (US)

(72) Inventor: Marla Brin, Alexandria, VA (US)

(*) Notice: Subject to any disclaimer, the term of this patent is extended or adjusted under 35 U.S.C. 154(b) by 223 days.

(21) Appl. No.: 15/191,630

(22) Filed: Jun. 24, 2016

(65) Prior Publication Data

US 2017/0367451 A1 Dec. 28, 2017

(51) Int. Cl.
*A45C 11/38* (2006.01)
*G03B 17/56* (2021.01)
*A45C 13/00* (2006.01)
*A45C 13/10* (2006.01)

(52) U.S. Cl.
CPC ............ *A45C 11/38* (2013.01); *A45C 13/002* (2013.01); *A45C 13/008* (2013.01); *A45C 13/103* (2013.01); *G03B 17/56* (2013.01)

(58) Field of Classification Search
CPC .. B65D 85/38; B65D 81/3897; B65D 81/389; A45C 11/38; A45C 11/22; A45C 13/008; G03B 17/08
USPC ...... 206/316.1, 316.2; 396/535, 27; D3/267, D3/268; 383/85, 88
See application file for complete search history.

(56) References Cited

U.S. PATENT DOCUMENTS

| | | | | |
|---|---|---|---|---|
| 1,671,385 A | * | 5/1928 | Strayer | A45C 11/22 383/68 |
| 1,689,396 A | * | 10/1928 | Lang | A45C 11/22 224/222 |
| 1,939,777 A | * | 12/1933 | Humboldt | B65D 81/3886 215/12.1 |
| 2,036,687 A | * | 4/1936 | Fisher | A45C 11/22 383/70 |
| 4,033,392 A | | 7/1977 | Less | |
| 4,136,726 A | | 1/1979 | Lee | |
| 4,172,485 A | * | 10/1979 | Mathieu | A45C 11/38 206/316.2 |
| 4,383,565 A | | 5/1983 | Denmat | |

(Continued)

FOREIGN PATENT DOCUMENTS

| | | | | |
|---|---|---|---|---|
| EP | 1151939 A2 | * | 11/2001 | ......... B65D 81/3897 |
| GB | 1066021 A | * | 4/1967 | ............. A45C 11/38 |

OTHER PUBLICATIONS

International Search Report (PCT/ISA/210) dated Sep. 28, 2017, by the U.S. Patent and Trademark Office as the International Searching Authority for International Application No. PCT/US2017/038908.

(Continued)

*Primary Examiner* — Allan D Stevens

(74) *Attorney, Agent, or Firm* — Buchanan Ingersoll & Rooney PC

(57) ABSTRACT

An exemplary protective case for photography equipment includes a housing having a plurality of layers for providing impact protection and thermal protection to the photography equipment, an open end, and a closed end. The plurality of layers includes a non-abrasive inner layer, an impact resistant outer layer, and a malleable intermediate layer formed between the inner and outer layers. A cover is attached to a surface of the outer layer, and is formed of at least one of an abrasive-resistant and waterproof material. The cover is configured to establish at least one of an air-tight and water-tight seal for the protective case.

19 Claims, 7 Drawing Sheets

(56) References Cited

U.S. PATENT DOCUMENTS

| | | | |
|---|---|---|---|
| 4,826,060 A * | 5/1989 | Hollingsworth | A45C 3/00 224/237 |
| 5,101,974 A | 4/1992 | Alwitt | |
| 5,201,867 A | 4/1993 | Morszeck | |
| 5,431,970 A | 7/1995 | Broun et al. | |
| 5,827,583 A * | 10/1998 | Ambler | B32B 15/08 428/35.2 |
| 5,931,583 A * | 8/1999 | Collie | A45C 11/20 383/110 |
| 6,149,305 A * | 11/2000 | Fier | A45C 11/22 383/107 |
| 8,292,523 B2 | 10/2012 | Dowell | |
| 8,781,312 B1 | 7/2014 | Desouza, Jr. et al. | |
| 2005/0061409 A1 * | 3/2005 | Chung | A45C 7/0081 150/110 |
| 2008/0247749 A1 | 10/2008 | Law et al. | |
| 2009/0202232 A1 * | 8/2009 | Kawakami | G03B 17/08 396/27 |
| 2014/0152890 A1 | 6/2014 | Rayner | |
| 2015/0353263 A1 * | 12/2015 | Seiders | B65D 81/3858 29/428 |
| 2017/0225872 A1 * | 8/2017 | Collie | B65D 81/3897 |

OTHER PUBLICATIONS

Written Opinion (PCT/ISA/237) dated Sep. 28, 2017, by the U.S. Patent and Trademark Office as the International Searching Authority for International Application No. PCT/US2017/038908.

http://www.harrisoncameras.co.uk/pd/Think-Tank-Digital-Holster-30-Expandable-Shoulder-Bag-V20_T.871.htm, retreived on Jun. 23, 2016.

http://www.amazon.com/Micro-Lens-Pouch-Thirds-Pentax/dp/B007TNFT5M, retreived on Jun. 23, 2016.

http://www.amazon.com/DICAPac-WP-S10-Camera-Series-Waterproof/dp/B00169HXW2, retreived on Jun. 23, 2016.

* cited by examiner

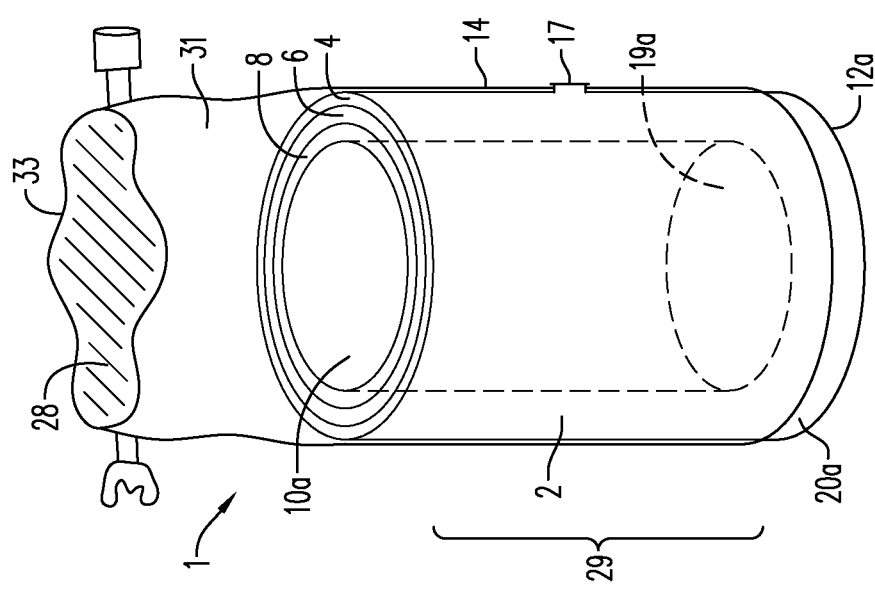
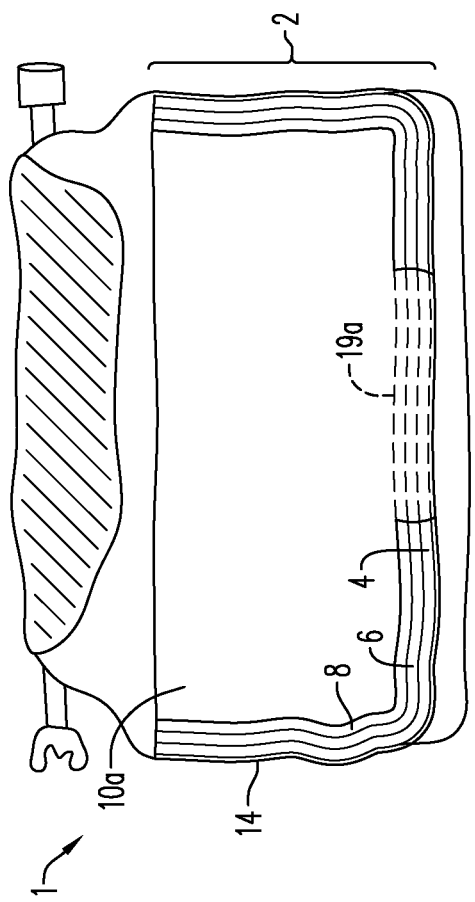
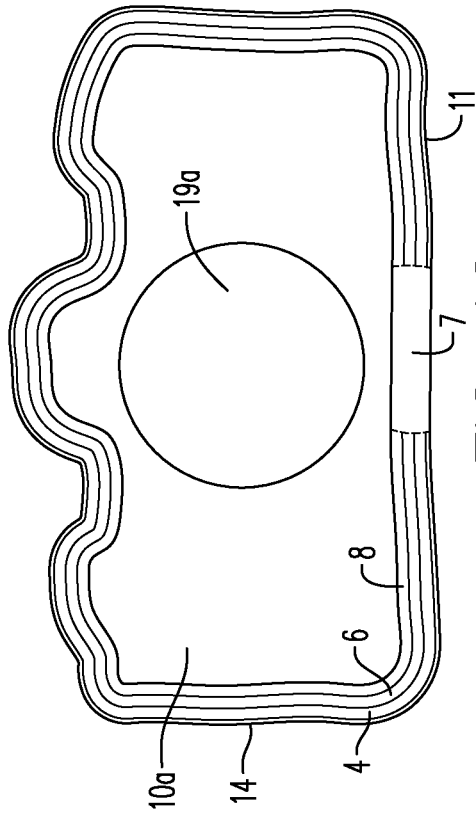

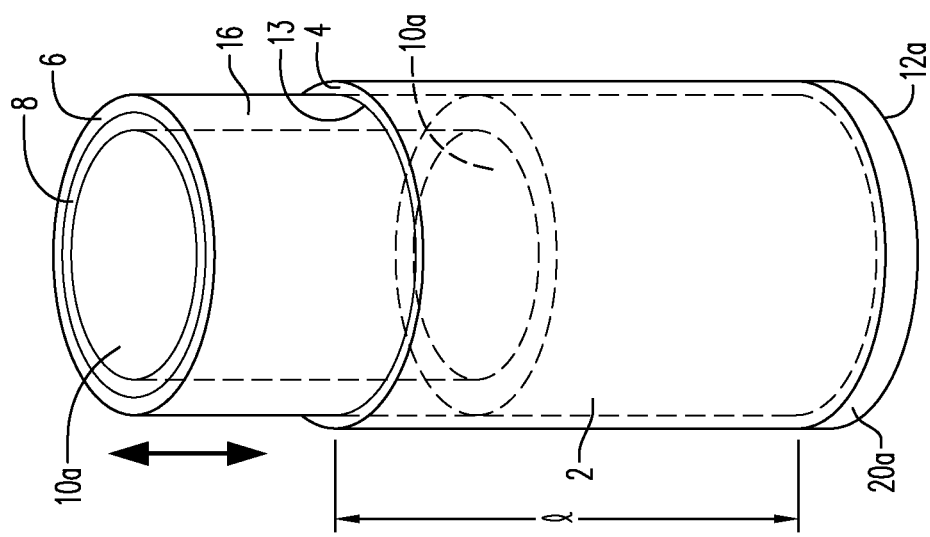

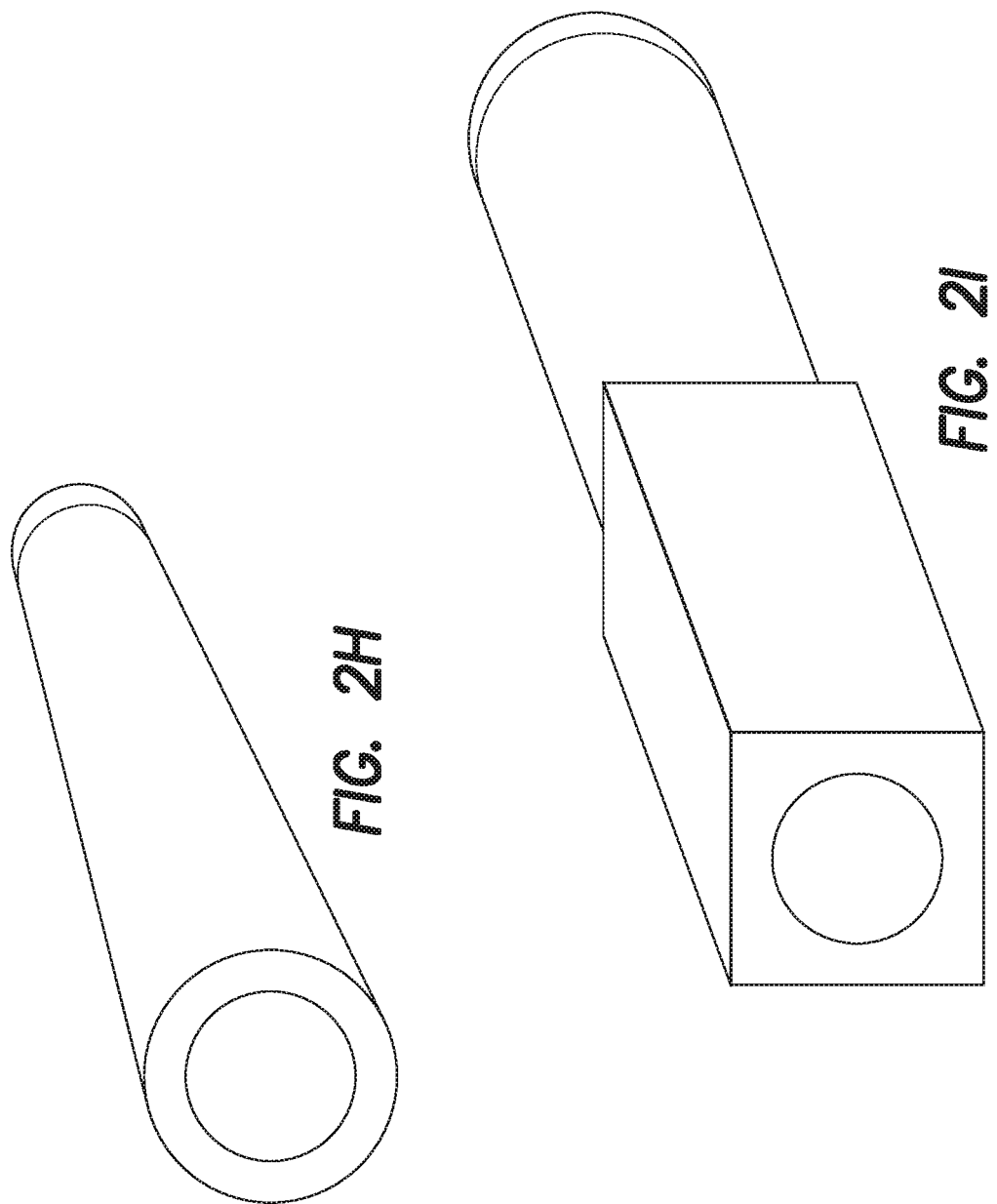

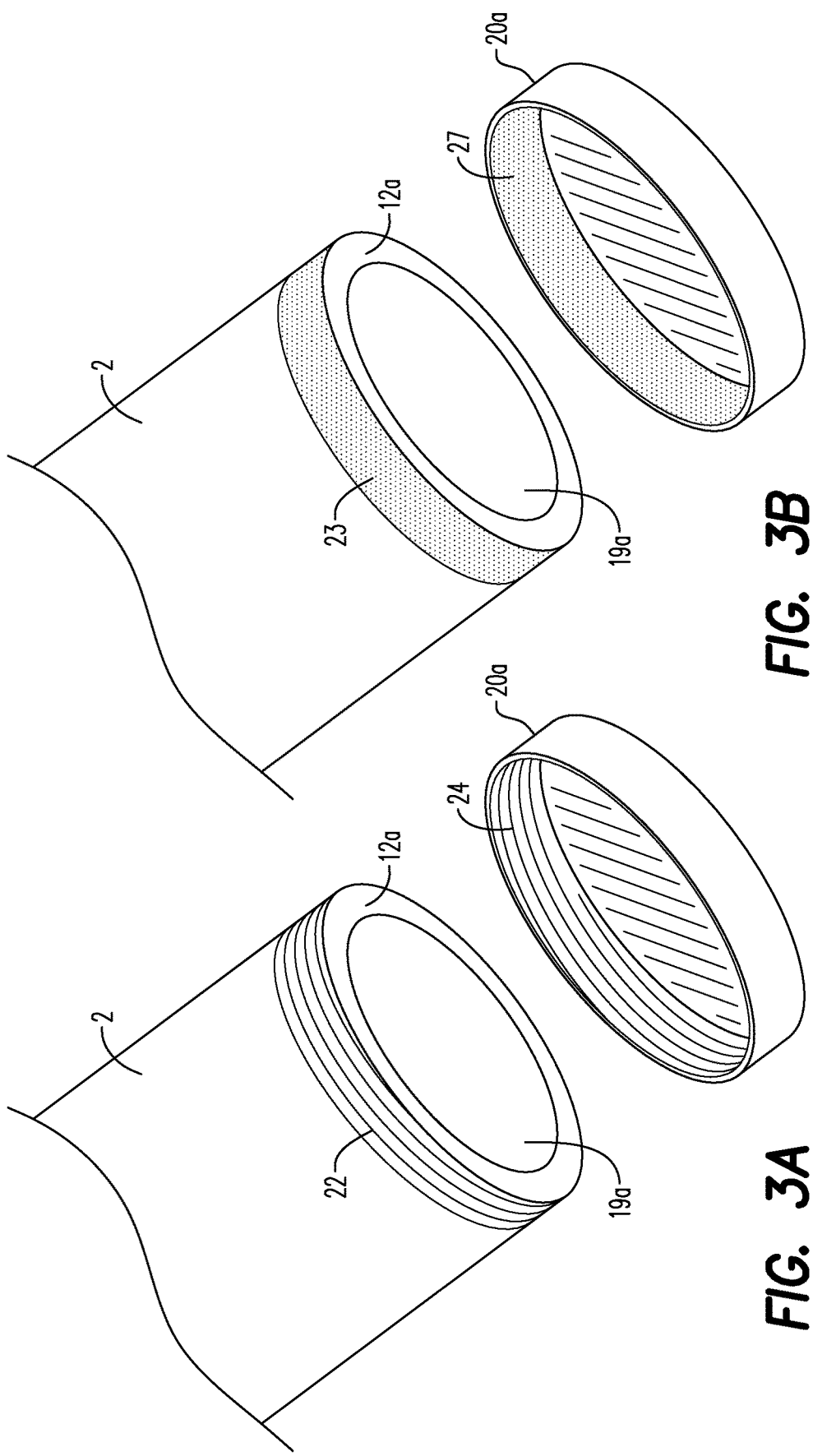

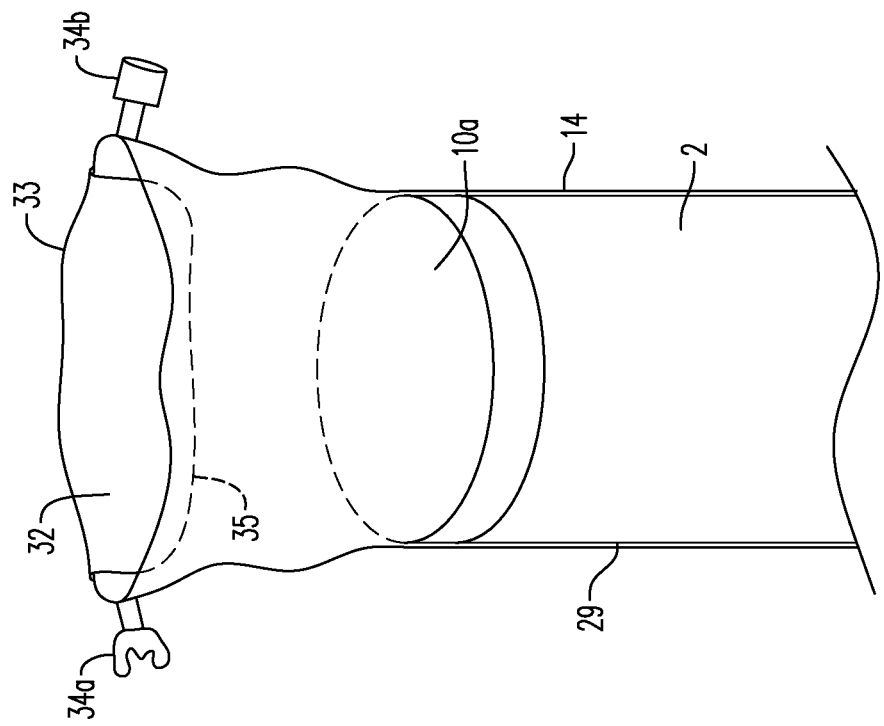
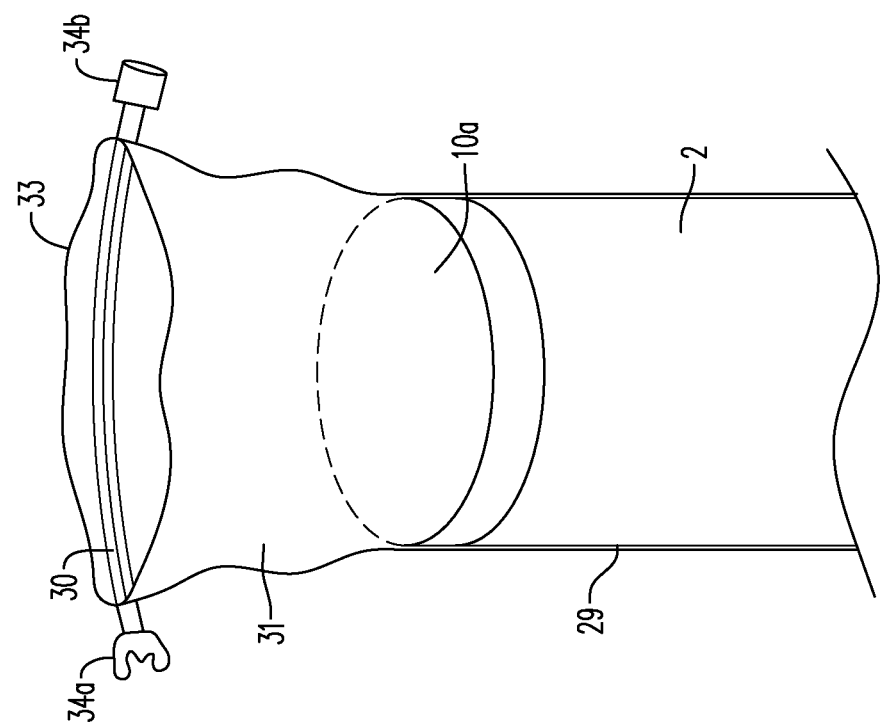

PROTECTIVE CASE FOR PHOTOGRAPHY EQUIPMENT

FIELD

The present disclosure relates to a protective case for photography equipment, and particularly to a case for transporting and protecting a camera body and lens.

BACKGROUND

Photography is an ever growing activity for both professionals and hobbyists alike. The equipment for obtaining ideal photos under varying conditions and locales can range from a few hundred to thousands of dollars. For this reason, it is imperative that photographers have means to protect their equipment and investment when out in the field. One means of transporting equipment in the field involves hard cases and large equipment bags. Generally, the hard cases have the appearance and functionality similar to a suitcase or briefcase. The hard cases have a watertight, airtight, dustproof, chemical resistant, and corrosion-resistant outer shell. The interior of the case is heavily padded with a foam type material, and has various compartments. Each compartment is of a shape and size sufficient to receive various articles of photographic equipment. Other known cases can include a hard outer shell with an interior with numerous compartments being separated by light padding and have any number of separate compartments for storing equipment. The compartments can be separated by foam dividers, which prevent collisions or contact among the pieces of equipment stored therein. Other products can include configurable compartments, where the dividers can be strategically arranged by a user.

While the hard cases can be suitable for protecting photographic equipment from the elements, the cases can be too bulky for transporting equipment within certain environments. Moreover, the hard case can be overkill when not all pieces of equipment are necessary for a particular field shoot.

Other versions of photography equipment bags can encompass soft or hard shell outer casings with padded interiors. These bags can be less cumbersome than the hard cases described above. However, they fail to provide sufficient protections from water or other potentially damaging environmental materials or substances for equipment, e.g., lenses and camera bodies, when they are being transported in the field in a configuration in which the lens and camera body are attached to one another, or when the lens and camera body are attached to one another and to a tripod.

SUMMARY

An exemplary protective case for photography equipment includes a housing having a plurality of layers for providing impact protection and thermal protection to the photography equipment. The housing also includes an open end and a closed end. The plurality of layers includes a non-abrasive inner layer, an impact resistant outer layer, and an insulated and deformable intermediate layer formed between the inner and outer layers. A cover is attached to a surface of the outer layer, and is formed of at least one of an abrasive-resistant and waterproof material. The cover is configured to establish at least one of an air-tight and water-tight seal for the protective case.

DESCRIPTION OF THE DRAWINGS

In the following the disclosure will be described in greater detail by means of exemplary embodiments with reference to the attached drawings, in which:

FIGS. 1A-1D illustrate exemplary protective cases for photography equipment in accordance with exemplary embodiments of the present disclosure;

FIGS. 2A-2I illustrate various cross-sections of the protective case in accordance with exemplary embodiments of the present disclosure;

FIGS. 3A and 3B illustrate perspective views of an end of the protective case in accordance with an exemplary embodiment of the present disclosure;

FIGS. 4A-4C illustrate exemplary sealing mechanisms of the protective case in accordance with exemplary embodiments of the present disclosure.

DETAILED DESCRIPTION

Figure 2A:
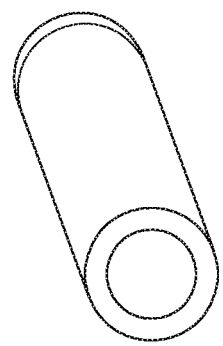

Exemplary embodiments of the present disclosure are directed to protective cases for shielding photography equipment from damaging impact caused by contact with environmental structures, dropping by a user, or other contact with hard surfaces or objects. Moreover, the protective case is configured for protecting photography equipment from materials or substances in the environment, such as water, wind, temperature, moisture, dust, liquids, or other elements that could have potentially damaging effects to the equipment. The protective case can be configured to protect a camera lens and camera body separately (e.g., individually) and/or when attached to each other. In addition, the protective case can be configured to protect the camera lens and camera body when attached to a tripod.

FIGS. 1A-1D illustrate exemplary protective cases for photography equipment in accordance with exemplary embodiments of the present disclosure. The photography equipment as described herein can include a photography lens, a camera body, and any other suitable components or combinations thereof. In each of FIGS. 1A-1D, the protective case 1 includes a housing 2 having a plurality of layers 4, 6, 8 for providing impact protection and thermal protection to the photography equipment to be stored therein. The plurality of layers 4, 6, 8 includes an outer layer 4, an intermediate layer 6, and an inner layer 8. The housing 2 also includes an first end 10a, a closeable second end 12a, and a cover 14. The cover 14 is attached to a surface of the outer layer 4 and is formed of an abrasive-resistant, a waterproof material, or any combination thereof, and is configured to establish at least one of an air-tight and water-tight seal at the first end 10a of the housing 2. The abrasive resistant material can include, for example, KEVLAR®, SUPERFABRIC®, CORDURA®, CUT-TEX®, or any other material having suitable properties and/or desired characteristics. The waterproof material can be formed of natural of synthetic fabrics that are laminated or coated with rubber, polyvinyl chloride, polyurethane, silicone elastomer, fluoropolymers, and/or wax, or any other material having suitable properties and/or desired characteristics.

The plurality of layers 4, 6, 8 can be formed of various materials that contribute to the impact and thermal protective characteristics. For example, the outer layer 4 can be formed of an impact resistant material such as those materials formed of acrylic, plastics, polycarbonate, phenolics, or any other material having suitable properties and/or desired characteristics. The inner layer 8 can be formed of a non-abrasive material including, for example, microfiber fabrics having a short to medium pile, felt, or any other material having suitable properties and/or desired characteristics that prevent scratches or abrasions on the photography equipment. Moreover, the inner layer 8 material can also have low-friction characteristics or properties which enable the photography equipment to be more easily deposited (e.g., slid, driven, or motivated) into the housing with the least amount of force as possible. The intermediate layer 6 can be formed of a deformable or padded material including, for example, insulated or thermal foam padding, closed cell or open cell foam, composite material, any combination thereof or any other material having suitable properties and/or desired characteristics that establish a snug, tight and/or secure fit to the contoured shape and/or surface features of the photography equipment to prevent, reduce, and/or guard against movement within the housing 2. The intermediate layer 6 can also include an insulating layers that prevents large temperature fluctuations (e.g., $\Delta t=\pm 10°$) so that the interior area of the housing 2 can be maintained at a substantially a constant temperature. The intermediate layer 6 and/or the inner layer 8 can be formed of a wicking fabric or material or breathable fabric that allows moisture to be extracted, siphoned, or drawn away from the equipment, if necessary.

According to an exemplary embodiment of the present disclosure the inner layer 8 and intermediate layer 6 can be implemented as a removable sleeve 16. As shown in FIG. 1D, the outer surface of the sleeve 16 can be formed of a friction-bearing material that attaches to an inner surface 13 of the outer layer 4 when inserted into the housing 2.

The plurality of layers 4, 6, 8 can have varying thicknesses. For example, the thickness of the outer layer 4 can range from 0.03 to 0.150 inches, and preferably at a thickness of 0.100 inches. The thickness of the inner layer 8 can range from 200 to 400 grams per square meter (GSM), and preferably at a thickness of approximately 350 GSM. The thickness of the intermediate layer can range from 1.0 to 2.0 cm, and preferably at a thickness of 1.5 cm.

The housing 2 can also include a closeable (e.g., sealable) valve 17, which provides an air or fluid passage between the outer layer 4 and the inner layer 8. The valve 17 provides a mechanism for controlling the temperature of the inner volume of the housing 2, and for accelerating the extraction of water and/or liquid from the surface of the photographic equipment.

FIGS. 1A-1D illustrate exemplary protective cases for photography equipment including a camera lens and camera body, respectively. As shown in FIGS. 1A-1D, the protective cases can be implemented as separate components. However, as will be described in detail below in accordance with another exemplary embodiment, the protective cases of FIGS. 1A-1D can also be combined to use as an integrated component.

FIGS. 2A-2I illustrate a cross-sectional view of the protective case in accordance with exemplary embodiments of the present disclosure. The cross-section of housing 2 can have any of a number of shapes. The various shapes of the housing 2 can safeguard against movement or rolling of the protective case when placed on an incline. The shape of the housing 2 can be consistent among the plurality of layers 4, 6, 8. According to other exemplary embodiments, the shape of the cross-section can vary across the plurality of layers 4, 6, 8.

Figure 2B:
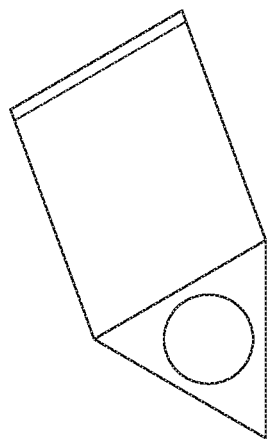
Figure 2C:
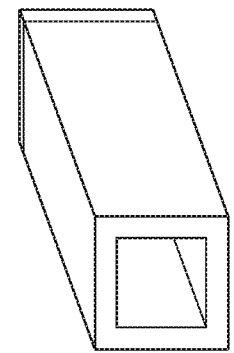
Figure 2D:
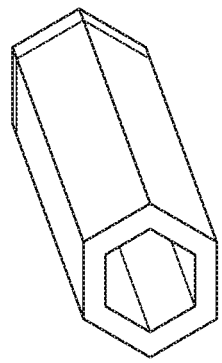
Figure 2E:
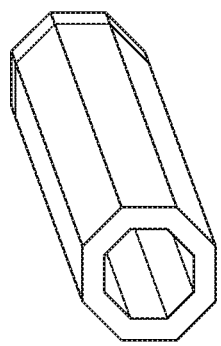
Figure 2F:
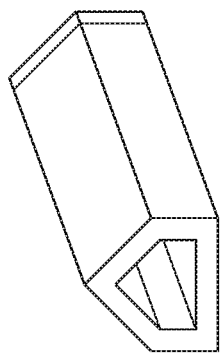
Figure 2G:
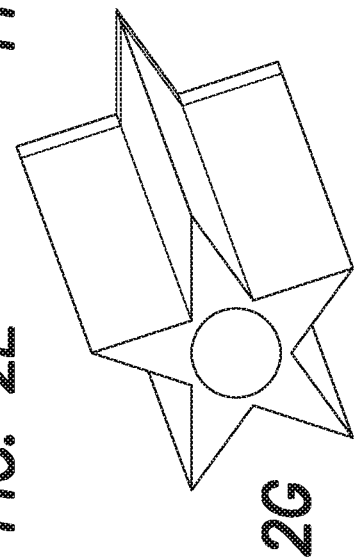

As shown in FIG. 2A, the housing 2 can have a cylindrical cross-section that is constant along the length of the housing and is consistent across the plurality of layers 4, 6, 8. FIG. 2B illustrates an exemplary embodiment in which the outer layer 4 has a triangular cross-section along its length, and at least one of the inner layer 8 and the intermediate layer 6 have a cylindrical cross-section. According to the embodiment of FIG. 2B, it should be apparent that the cross-section of the outer layer 4 can have the form of any suitable polygonal shape along its length. For example, FIGS. 2C-2I illustrate several exemplary shapes of outer layer cross-section, which can include but are not limited to a square, hexagon, octagon, pentagon, and star. FIGS. 2C-2I also illustrate that at least one of the inner layer 8 and the intermediate layer 6 have a cylindrical cross-section such that the insulated and deformable padded material of the intermediate layer 6 can more suitably provide a tight fit and/or firm contact against the surface features of the photography equipment.

FIGS. 2A-2G illustrate an exemplary housing 2 having a constant cross-section along a length "$\ell$". According to an exemplary embodiment, the shape of the housing 2 can also be configured to accommodate photography equipment having a varying cross-section along its length. For example, known camera lenses can have a diameter on one end that is different (e.g., larger or smaller) than a diameter on the opposite end. FIG. 2H illustrates an exemplary housing 2 having a cross-section that varies or changes along its length. As shown in FIG. 2H, the outer layer 4 can maintain a substantially cylindrical or curved cross-section along its length even though the diameter of the cylinder at different points along the length can be different. In FIG. 2I illustrates another exemplary embodiment, in which the outer layer 4 can have a cylindrical shape along one portion of its length and a polygonal shape along the remaining portion of its length. As a result, the outer layer 4 allows the protective case 1 to maintain a stationary position on an incline as already discussed.

As shown in FIGS. 1A-1D, the first end 10a of the housing 2 has an aperture for receiving photography equipment, such as a camera lens. As already discussed, the inner layer 8 can be formed of a low-friction material that enables the camera lens to be deposited within the housing 2 with the least amount of force as possible. The second end 12a of the housing 2 has a cap 20a. The cap 20a can be implemented in a fixed configuration or a removable configuration. For the removable configuration, when the cap 20a is not attached to the housing 2, the second end 12a has an aperture 19a to allow access to an inner volume of the housing 2. The aperture 19a is also shown in FIGS. 3A and 3B, which allows a user to insert photography equipment or enable access to the photography equipment for adjustment, maintenance, inspection, cleaning, or any other suitable activity as desired. Depending on the cross-sectional shape of the housing 2, the aperture 19a can be any of a circular or polygonal shape consistent with the housing 2. Moreover, based on whether the housing 2 has a constant cross-section or a cross-section that varies along its length, the diameter of the aperture 19a can be larger or smaller than the diameter of the first end 10a. The housing 2 of FIG. 1C also includes an aperture 19a and an aperture 7 in a side wall 11, which provides a pass through for additional components, such as a tripod, to be attached to the photographic equipment disposed in the housing 2.

FIGS. 3A and 3B illustrate perspective views of an end of the protective case in accordance with an exemplary embodiment of the present disclosure. A removable cap 20a can be attached to the second end 12a in any of a number of known securing or clamping techniques or arrangements. For example, as shown in FIG. 3A the second end 12a can have a threaded outer surface 22 and the removable cap 20a can have a threaded inner surface 24. The threaded outer surface 22 of the end can be mated to the threaded inner surface 24 of the removable cap 20a so that the removable cap 20a is screwed onto the second end 12a of the housing 2. As shown in FIG. 3B, the second end 12a can have a friction bearing outer surface 23 and the removable cap 20a can have a friction bearing inner surface 27, to cover the aperture 19a and establish the second end 12a as a closed end of the housing 2, the removable cap 20a can be forcibly motivated, pushed, driven onto the second end 12a so that the friction bearing outer surface 23 and the friction bearing inner surface 27 form a secure attachment.

As shown in FIG. 1A, the cover 14 is attached to a surface of the outer layer 4. The attached or first portion 29 of the cover 14 can be affixed to the outer layer 4 of the housing 2 through any of known bonding or adhesion materials and/or techniques. In accordance with an exemplary embodiment of the present disclosure, the attached portion 29 of the cover 14 can form an additional layer on the outer layer 4, which either partially or fully covers the outer layer 4 of the housing 2. The cover 14 also includes an unattached or second portion 31 that extends over or extends past the first end 10a of the housing 2 in a lengthwise direction to form a bag or bag-like structure. At a top edge 33, the cover 14 includes a sealing mechanism 28. The sealing mechanism 28 is configured to provide an air and/or water-tight seal that protects the inner area of the housing 2 from the environment. The sealing mechanism 28 can be implemented through the use of any suitable or known sealing technique or structure including but not limited to VELCRO®, resealable tape, ZIP-LOC®, zipper, or other configuration as desired.

Figure 4C:
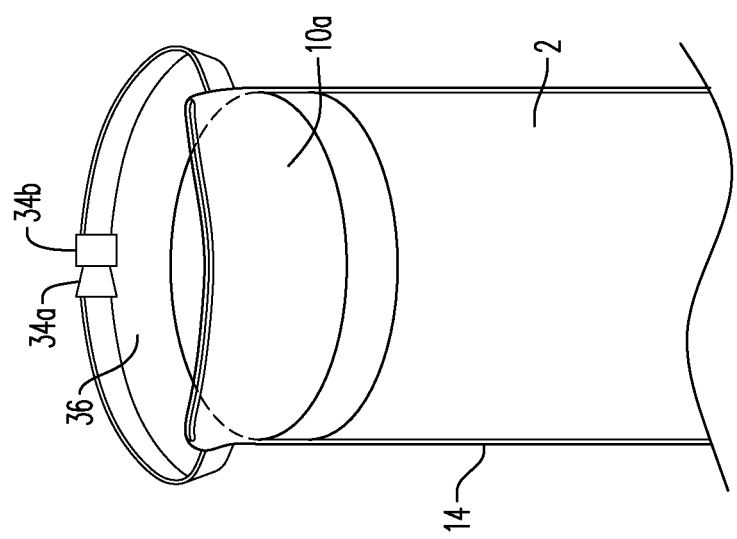

FIGS. 4A-4C illustrate exemplary sealing mechanisms of the protective case in accordance with exemplary embodiments of the present disclosure. As already discussed, the sealing mechanism 28 is located at the top edge 33 of the cover 14 and is designed to safeguard the inner area of the housing 2 from air, water, dust, dirt, and/or any other foreign particles or substances that could damage or reduce the output quality of the equipment. As shown in FIG. 4A, the sealing mechanism 28 can be implemented with a zipper mechanism 28. FIG. 4B illustrates an exemplary sealing mechanism 30 that is implemented with a roll-top mechanism 32. As shown in FIG. 4B, the roll-top mechanism 32 includes a flexible plastic sheet 35 that extends across an entire width of the top edge and partially lengthwise from the top edge 33 of the unattached portion 31 towards the first end 10a of the housing 2. In each of FIGS. 4A and 4B, the sealing mechanism 28 is used in concert with buckles or clasps 34a, 34b. The buckles 34a, 34b can be disposed on opposite sides near the top edge 33 of the cover 14.

The description that follows provides the steps for operating the sealing mechanism 28. Prior to manipulating the sealing mechanism 28, opposite sides of the unattached portion 31 of the cover 14 should be pressed together in order to evacuate as much air as possible from the unattached portion 31. If the sealing mechanism 28 has a zipper or ZIP-LOC® arrangement as shown in FIG. 4A, once sides the unattached portion 31 are pressed together, the zipper mechanism 30 should be manipulated to close the top edge 33 of the cover 14. After the top edge 33 of the cover is closed, the buckles 34a, 34b can be connected.

According to another exemplary embodiment, if the sealing mechanism 28 has the roll-top mechanism 32, opposite sides of the unattached portion 31 of the cover 14 should be pressed together in order to evacuate (e.g., purge) as much air as possible from the unattached portion 31. The unattached portion 31 should then be folded or rolled over down to a folding band. The folding process via the folding band should be repeated plurality of times from the top edge 33 or until the folded portion meets the first end 10a of the housing 2. After the folding of the unattached portion 31 is complete, the buckles 34a, 34b can be connected. As shown in FIG. 4C, connecting the buckles 34a, 34b forms an aperture 36 which can be used as a handle for carrying, transporting, or securing the protective case 1 to another component.

The protective case 1 described above in relation to FIGS. 1A-1D are configured for encasing and/or providing protection for individual photography equipment and components, such as a camera lens and camera body. In accordance with an exemplary embodiment described herein a protective case can also be configured for protecting photography equipment having an arrangement in which the camera body and camera lens are attached or connected to one another.

Figure 5:
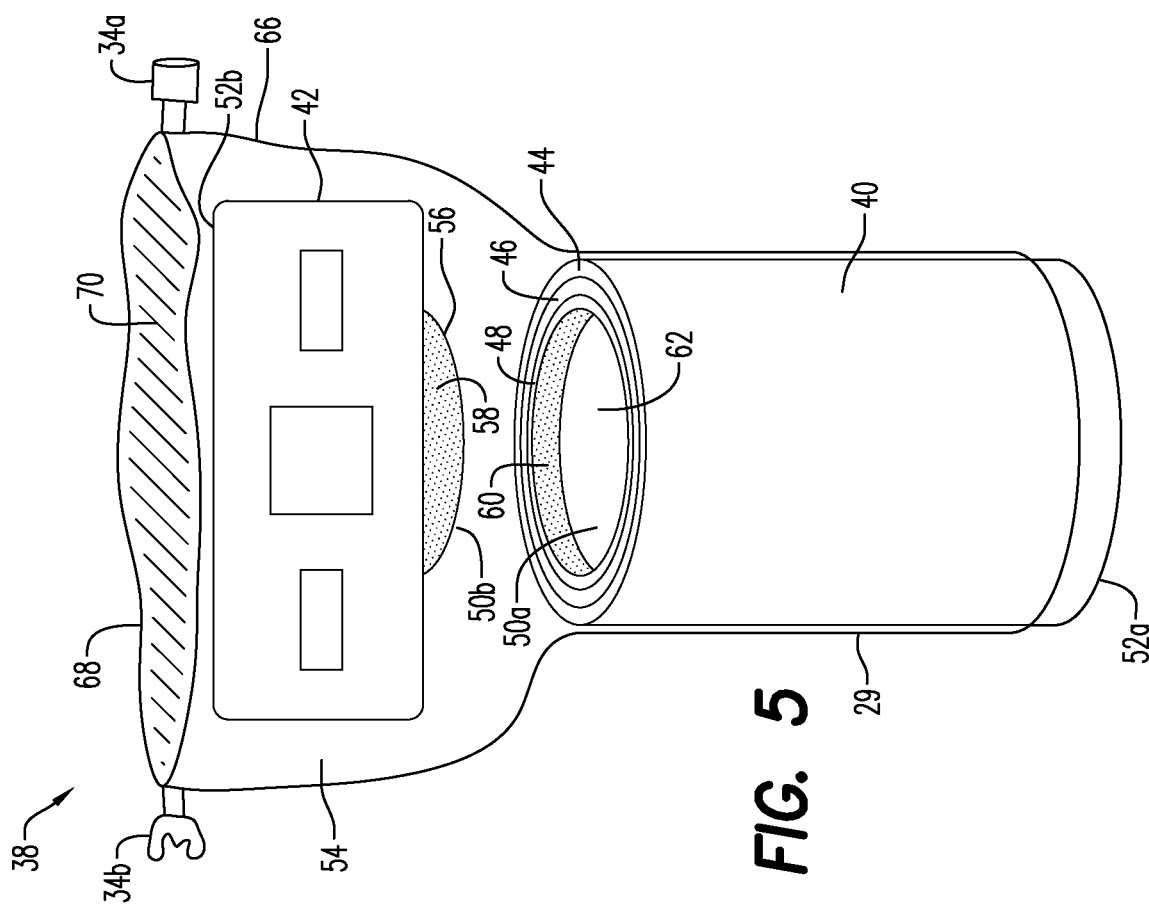
FIG. 5 illustrates a protective case that includes a plurality of housings in accordance with an exemplary embodiment of the present disclosure.

FIG. 5 illustrates a protective case that includes a plurality of housings in accordance with an exemplary embodiment of the present disclosure. As shown in FIG. 5, the protective case 38 can include a first housing 40 and a second housing 42. The first housing 40 can be configured according to the housing 2 described and illustrated in connection with FIG. 1A. The second housing 42 can be configured according to the housing 2 described and illustrated in connection with FIG. 1B. For example, each of the first housing 40 and the second housing 42 include a plurality of layers 44, 46, 48 encompassing (e.g., comprising) an outer layer 44, an intermediate layer 46, and an inner layer 48 of the first housing 40, and an outer layer 4, an intermediate layer 6, and an inner layer 8 of the second housing 42 as shown in FIG. 1B. Each housing 40, 42 also include respective open ends 50a, 50b and closed ends 52a, 52b. A cover 54 is attached to a surface of the outer layer 44 of the first housing 40 and is formed of an abrasive-resistant, a waterproof material, or any combination thereof, and is configured to establish at least one of an air-tight and water-tight seal at the closed end 52b of the second housing 42.

FIG. 5 illustrates that in this configuration, the open ends 50a, 50b of the first housing 40 and second housing 42, respectively are adjacent and/or in close proximity to establish surface contact. The open end 50b of the second housing 42 can include a lip 56 having an outer surface 58 that is formed of a friction-bearing material. The open end 50a of the first housing 40 can have an inner edge 60 that is formed of a friction-bearing material. The open end 50a of the first housing 40 can be of a larger diameter than the open end 50b of the second housing 42. As a result and upon assembly, the lip 56 of the second housing 42 can be inserted into the aperture 62 of the open end 50a of the first housing 40 and engage the friction-bearing inner edge 60 of the open end 50a of the first housing 40.

The cover 54 includes an attached portion 29 and an unattached portion 66. The attached portion 29 can form an additional layer on the outer layer 44 of the first housing 40, which either partially or fully covers the outer layer 44 of the first housing 40. The unattached portion 66 can extend over or extend past the closed end 52b of the second housing 42 in a lengthwise direction to form a bag or bag-like structure. At a top edge 68, the cover 54 includes a sealing mechanism 70. The sealing mechanism 70 operates in the same manner as described in relation to FIGS. 1A-1D above, and is configured to provide an air and/or water-tight seal to protect an inner area of the first and second housings 40, 42 from the environment.

It should be understood that the dimensions of the various features of the protective case described herein, including the thicknesses of the plurality of layers 4, 6, 8 can be varied as desired to provide protection for photography equipment of different shapes and sizes. The embodiments illustrated through the Figures of the present disclosure, are exemplary representations of the invention and in some instances are exaggerated to show specific details of the invention. Any number of other implementations and variations on the design, which achieve and provide the same utility of the embodiments discussed herein, are possible and within the scope of the disclosed embodiments.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A protective case for photography equipment comprising:
   a housing having a plurality of layers for encountering one or more of a plurality of environmental substance, an open end, and a closeable end,
   the plurality of layers including a non-abrasive inner layer, an impact resistant outer layer, and an intermediate layer formed between the inner and outer layers,
   a cover having a first portion affixed to an entire surface of the outer layer and a second portion extending from the open end of the housing, the cover being formed of one or more of an abrasive-resistant and waterproof material and is configured to establish an air-tight and/or a water-tight seal for the protective case.

2. The protective case of claim 1, wherein the intermediate layer is a temperature insulating layer for an inner area of the housing.

3. The protective case of claim 2, wherein the housing has a cylindrical cross-section.

4. The protective case of claim 2, wherein the outer layer has a triangular cross-section, and at least one of the inner layer and the intermediate layer has a cylindrical cross-section.

5. The protective case of claim 2, wherein the outer layer has a polygonal cross-section, and at least one of the inner layer and the intermediate layer has a cylindrical cross-section.

6. The protective case of claim 2, wherein the housing has a constant cross-section along a longitudinal axis.

7. The protective case of claim 2, wherein the housing has more than one cross-sectional shape along a longitudinal axis.

8. The protective case of claim 1, wherein the open end has an aperture for receiving a camera lens.

9. The protective case of claim 8, wherein the closeable end has a removable cap.

10. The protective case of claim 9, wherein the closeable end has a threaded outer surface that mates to a threaded inner surface of the removable cap for screwing the removable cap onto the housing.

11. The protective case of claim 9, wherein the closeable end has a friction bearing outer edge that mates with a friction bearing inner surface of the removable cap for securing the removable cap onto the housing.

12. The protective case of claim 9, wherein the closeable end has an aperture with a diameter that is different from an aperture of the open end.

13. The protective case of claim 1, wherein at the open end of the housing, the cover includes a zipper sealing mechanism.

14. The protective case of claim 1, wherein at the open end of the housing, the second portion of the cover includes a roll-top sealing mechanism.

15. The protective case of claim 14, wherein the roll-top sealing mechanism of the cover includes flexible plastic on a top edge and buckles on each side near the top edge, and is configured to form the air-tight and water-tight seal when the top edge is folded or rolled plural times.

16. The protective case of claim 15, wherein the buckles on each side are connected at a height above a folded edge to form an aperture.

17. The protective case of claim 16, wherein the aperture formed by the connected buckles forms a handle.

18. A protective case for photography equipment, comprising:
   a first housing having a plurality of layers for encountering one or more of a plurality of environmental substances, two open ends, the plurality of layers including a first non-abrasive inner layer, a first impact resistant outer layer, and a first intermediate layer formed between the first inner and first outer layers;
   a cover having a first portion affixed to an entire surface of the outer layer and a second portion extending from one of the two open ends of the housing, the cover being formed of one or more of an abrasive-resistant and waterproof material and is configured to establish an air-tight and/or a water-tight seal for the protective case;
   a second housing having a plurality of layers for encountering one or more of a plurality of environmental substances, a second open end, and a second closed end,
   the plurality of layers of the second housing including a second non-abrasive inner layer, a second impact resistant outer layer, and a second intermediate layer formed between the second inner and second outer layers,
   wherein the first housing is formed to encase a camera lens and the second housing is formed to encase a camera body connected to or detached from the camera lens, the second open end of the second housing being detachably connected to the one of the two open ends of the first housing, and
   wherein the second portion of the cover extends over the second housing.

19. A protective case for photography equipment, comprising:
   a first housing having a plurality of layers for encountering one or more of a plurality of environmental substance, two open ends, the plurality of layers including a first non-abrasive inner layer, a first impact resistant outer layer, and a first intermediate layer formed between the first inner and first outer layers;
   a cover having a first portion affixed to an entire surface of the outer layer and a second portion extending from one of the two open ends of the housing, the cover being formed of one or more of an abrasive-resistant and waterproof material and is configured to establish an air-tight and/or a water-tight seal for the protective case;

a second housing detachably connected to the first housing, the second having a plurality of layers for encountering one or more of a plurality of environmental substance, a second open end, and a second closed end, the plurality of layers of the second housing including a second non-abrasive inner layer, a second impact resistant outer layer, and a second intermediate layer formed between the second inner and second outer layers, wherein the first housing is formed to encase a camera lens and the second housing is formed to encase a camera body connected to or detached from the camera lens, the second open end of the second housing being detachably connected to the one of the two open ends of the first housing, and wherein the cover provides the air-tight and water-tight seal and encloses the first housing and the second housing.

* * * * *